No. 691,490. Patented Jan. 21, 1902.
C. ROBINSON.
ENGINE BEARING AND ADJUSTING MEANS THEREFOR.
(Application filed May 20, 1901.)
(No Model.) 2 Sheets—Sheet 1.

WITNESSES:
C. L. Belcher
J. C. Morse

INVENTOR
Cyrus Robinson
BY Wesley G. Carr
ATTORNEY.

No. 691,490. Patented Jan. 21, 1902.
C. ROBINSON.
ENGINE BEARING AND ADJUSTING MEANS THEREFOR.
(Application filed May 20, 1901.)
(No Model.) 2 Sheets—Sheet 2.

WITNESSES:
C. L. Belcher
J. C. Morse

INVENTOR
Cyrus Robinson
BY
Ansley G. Carr
ATTORNEY.

UNITED STATES PATENT OFFICE.

CYRUS ROBINSON, OF EDGEWOOD PARK, PENNSYLVANIA, ASSIGNOR TO THE WESTINGHOUSE MACHINE COMPANY, A CORPORATION OF PENNSYLVANIA.

ENGINE-BEARING AND ADJUSTING MEANS THEREFOR.

SPECIFICATION forming part of Letters Patent No. 691,490, dated January 21, 1902.

Application filed May 20, 1901. Serial No. 61,104. (No model.)

*To all whom it may concern:*

Be it known that I, CYRUS ROBINSON, a subject of the King of Great Britain, residing at Edgewood Park, in the county of Allegheny and State of Pennsylvania, have invented a new and useful Improvement in Engine-Bearings and Adjusting Means Therefor, of which the following is a specification.

My invention relates to shaft-bearings for engines and to means for adjusting the same.

The object of my invention is to provide bearings of improved construction which shall be adapted for engines of large size and to also provide simple and easily-operated means whereby the bearings may be readily adjusted to bring them into exact horizontal alinement.

My invention is illustrated in the accompanying drawings, in which—

Figure 1:
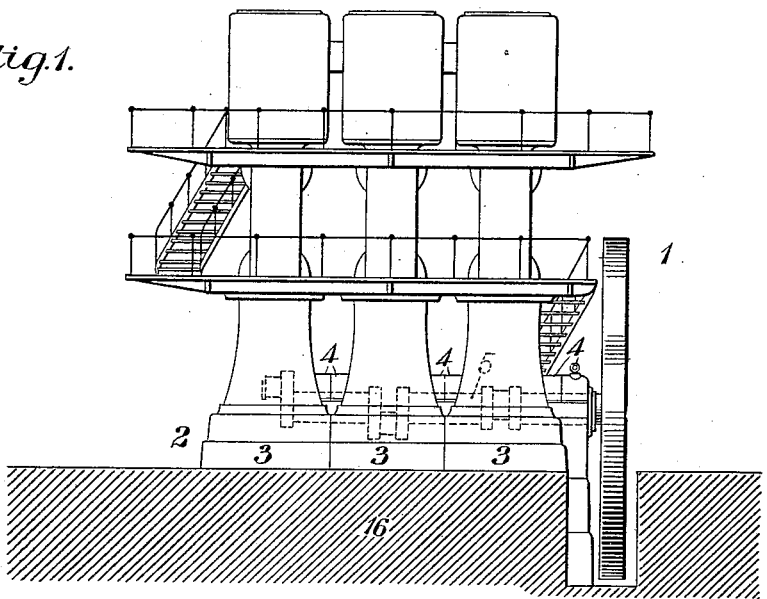
Figure 2:
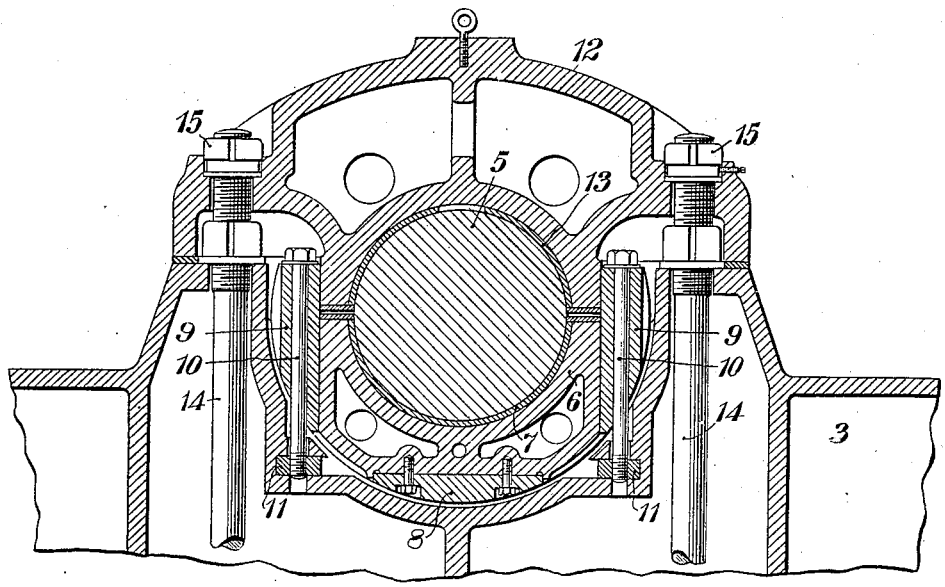
Figure 3:
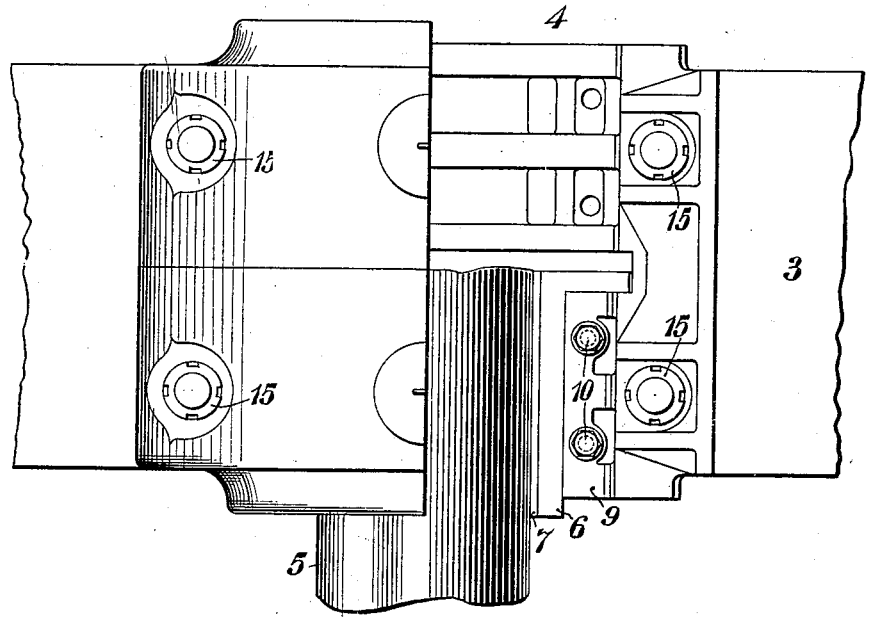
Figure 4:
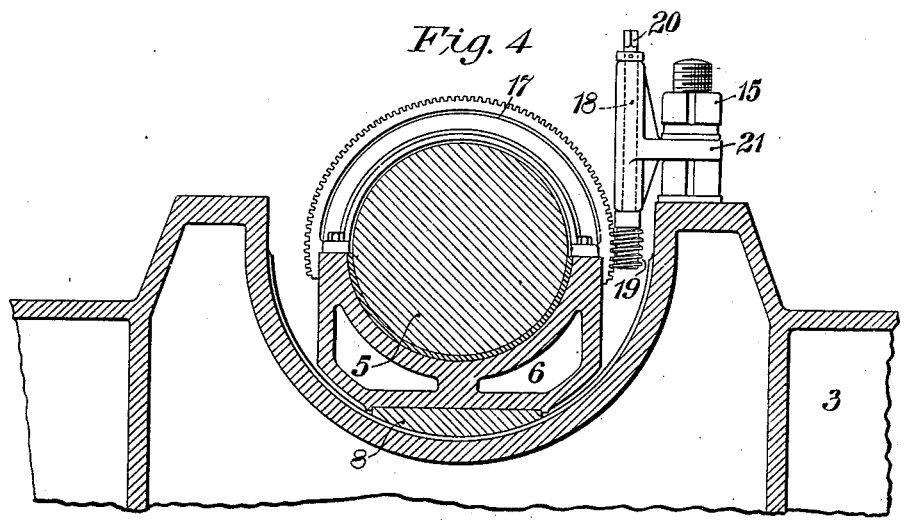

Figure 1 is a front elevation of an engine having shaft-bearings constructed in accordance with my invention. Fig. 2 is a sectional view taken on line II II of Fig. 3, parts being broken away. Fig. 3 is a plan view of two of the bearings constructed in accordance with my invention, parts being removed to show the internal construction. Fig. 4 is a sectional view of a portion of a bed-plate and one of the bearings and showing in side elevation the means for rotating the lower bearing-box in order to insert adjusting devices.

The engine 1 is provided with a bed-plate 2, composed of a plurality of castings 3, three of such castings being here shown. These castings are bolted or otherwise securely fastened together, so as to constitute, in effect, a single structure, and such structure is provided with six bearing-boxes 4 for the main crank-shaft 5. The lower half of each bearing-box 4 comprises an approximately U-shaped piece 6, having a Babbitt-metal lining 7 and a flat bottom, to which is bolted a segment 8, the exterior of which is curved to conform to the bearing-recess in the casting 3, in which the said part is located. Side pieces 9 are fitted to the upright sides of the part 6 and are clamped to the bed-plate 3 by means of bolts 10 and nuts 11. The outer surface of each of these pieces 9 is curved to form a continuation of the cylindrical surfaces of the parts 6 and 8, so as to fit the bearing-recess in the casting 3, as indicated in Fig. 2. The upper portion of the bearing-box 4 is a cap 12, that is provided with the usual Babbitt-metal lining 13 and is clamped in position by means of large bolts 14, anchored to the base-plate, and nuts 15 on the upper ends of the bolts.

By reason of the construction thus far described the bearing-boxes may be readily placed in position and as readily removed, and the base-plate sections may be mounted upon the shop-floor and the bearings bored out by means of a bar carrying a suitable cutter, thus insuring perfect alinement and avoiding the necessity of mounting the bed-plates upon a planer, as is the usual practice.

When the engine is mounted upon suitable masonry 16 in the power-house where it is to operate, as indicated in Fig. 1, if the shaft is not perfectly horizontal any or all of the bearing-boxes may be adjusted the necessary amount to bring them into horizontal alinement by means which will now be described. The caps 12 and the parts 9, 10, and 11 will be removed and a worm-wheel segment 17 be bolted to the part 6 of the bearing-box which it is desired to adjust, as indicated in Fig. 4. In order to rotate the worm-wheel segment 17 and the parts 6 and 8, I provide a shaft 18, having at its lower end a worm 19 and at its upper end a squared portion 20, and mount this shaft in a bracket 21, the bracket being fastened to the bed-plate by means of one of the bolts 14 and nuts 15.

When it is desired to operate the parts just described for the purpose of turning the parts 6 and 8 around the shaft, the latter is first raised slightly by suitable lifting mechanism, so as to free the parts 6 and 8 from the weight of the shaft. The shaft 18 may then be turned, by means of a suitable lever or hand-wheel, so that the worm and worm-wheel segments will serve to move the parts 6 and 8 in a clockwise direction until the part 8 is free from the bed-plate, when it may be removed and one or more shims inserted between it and the part 6 in order that the box may be adjusted vertically to the extent desired. The part 8 may then be again bolted in place and the parts returned, by means of the worm-gearing, to the position indicated in Fig. 4, after which the latter may be removed and the parts 9, 10, 11, and 12 be replaced.

The construction of bearings and adjusting mechanism here illustrated and described is especially adapted to engines of large size, such as have exceptionally long shafts, which are from twenty to thirty inches and upward in diameter, the ordinary adjustment by means of wedges, such as have usually been employed in connection with smaller engines, being impracticable in engines of such large size.

While the construction shown has been found to be admirably adapted to the work for which it is intended, I desire it to be understood that the details may be varied within considerable limits without departing from the spirit and scope of my invention.

I claim as my invention—

1. In an engine, the combination with a bed-plate and a shaft, of a plurality of bearing-boxes for the shaft each of which comprises a plurality of removable parts which are fastened to the bed-plate and a plurality of parts which are fastened together independently of the bed-plate, and means whereby one of the last-named parts may be adjusted to effect proper alinement of the bearings.

2. In an engine, the combination with a bed-plate having a plurality of sections clamped together, of a plurality of bearing-boxes, each of which comprises a cap bolted to the bed-plate, two side pieces also bolted to the bed-plate and a bottom piece consisting of two parts and resting upon but not fastened to the bed-plate.

3. In an engine, the combination with a bed-plate and a shaft, of a plurality of bearing-boxes each of which comprises removable parts bolted to the bed-plate and a rotatable part resting upon but not fastened to the bed-plate and means for turning the last-named part about the shaft.

4. In an engine, the combination with a bed-plate and a shaft, of a plurality of bearing-boxes for the shaft each comprising a plurality of removable parts fastened to the bed-plate, a rotatable part made in two sections and means for turning said part about the shaft to admit of the separation of said sections and the insertion of adjusting means between them.

5. The combination with an engine bed-plate and a shaft, of a plurality of bearing-boxes for the shaft each comprising a plurality of removable parts fastened to the bed-plate, a rotatable part made in two separate sections and removable gearing for rotating said rotatable part until one of its sections is clear of the bed-plate.

6. A bearing-box for an engine-shaft comprising a cap and a multiple-part bottom portion, the main section of which has a bottom piece that is adjustable in the plane of the shaft-axis only, and means for clamping said piece in its adjusted position.

7. A bearing-box for an engine-shaft comprising a cap and a multiple-part bottom portion, the side sections of which are provided with means for removably fastening them to the engine bed-plate and the main section of which has an adjustable bottom piece.

8. A bearing-box for an engine-shaft comprising a cap and a multiple-part bottom portion, the side sections of which are provided with means for removably fastening them to the bed-plate, and the main section of which has an adjustable bottom piece, in combination with means for rotating the main section to permit adjustment of its bottom piece.

9. The combination with an engine bed-plate comprising a plurality of sections, of a shaft and bearing-boxes therefor each of which comprises a removable cap and a multiple-part base the side sections of which are removably fastened to the bed-plate and the main section of which has an adjustable bottom piece.

In testimony whereof I have hereunto subscribed my name this 10th day of May, 1901.

CYRUS ROBINSON.

Witnesses:
 ANNA G. CHANNELL,
 DAVID WILLIAMS.